Feb. 3, 1953　　　　　　H. J. BERGE　　　　　　2,627,223
BALING MACHINE FOR COMPACTING STRAW AND STALKS FROM
　　　HARVESTING MACHINES INTO CYLINDRICAL BALES
Filed Aug. 8, 1949　　　　　　　　　　　　　5 Sheets-Sheet 1
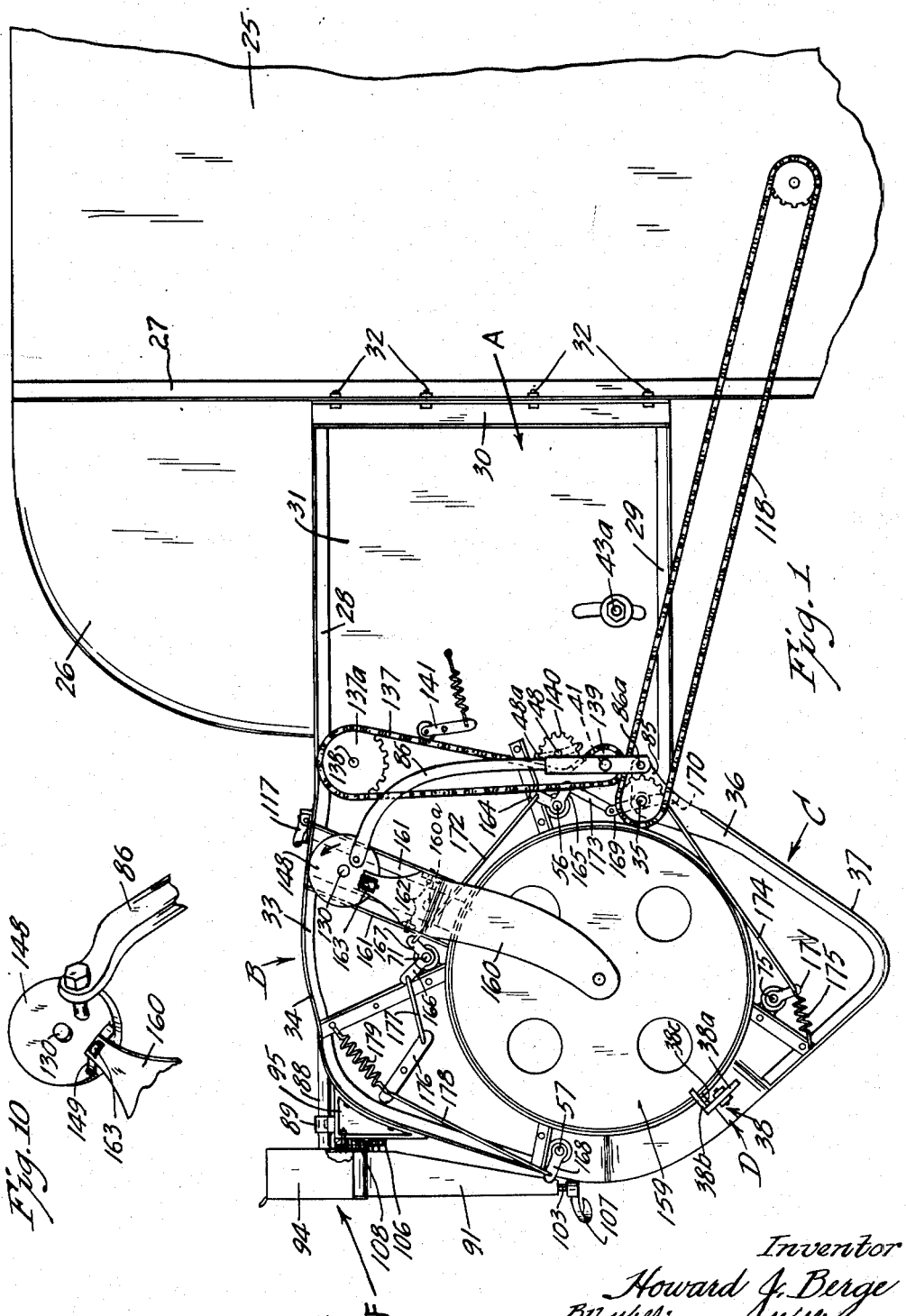
Inventor
Howard J. Berge
By Williamson & Williamson
　　　　Attorneys

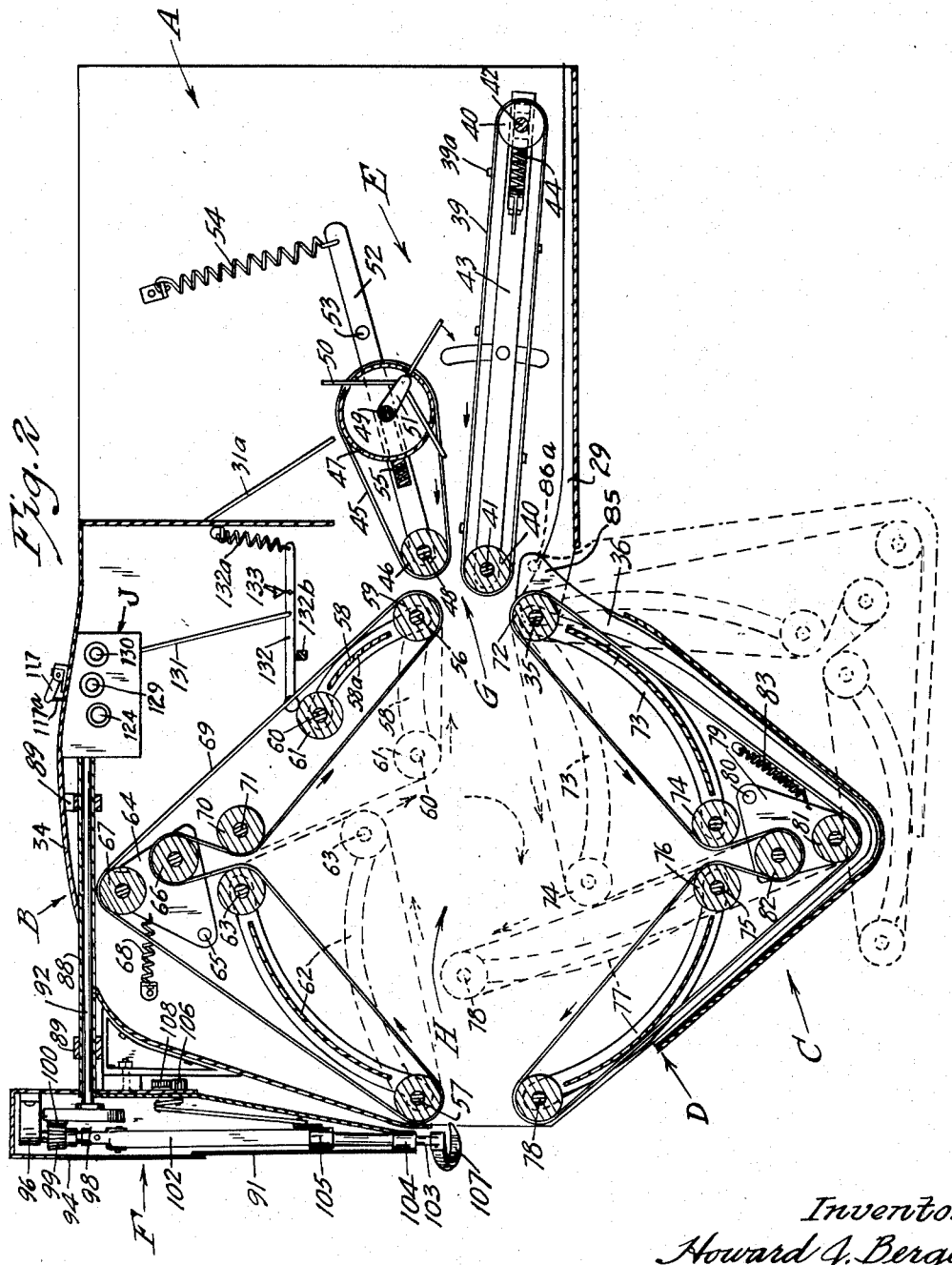

Feb. 3, 1953   H. J. BERGE   2,627,223
BALING MACHINE FOR COMPACTING STRAW AND STALKS FROM
HARVESTING MACHINES INTO CYLINDRICAL BALES
Filed Aug. 8, 1949   5 Sheets-Sheet 3
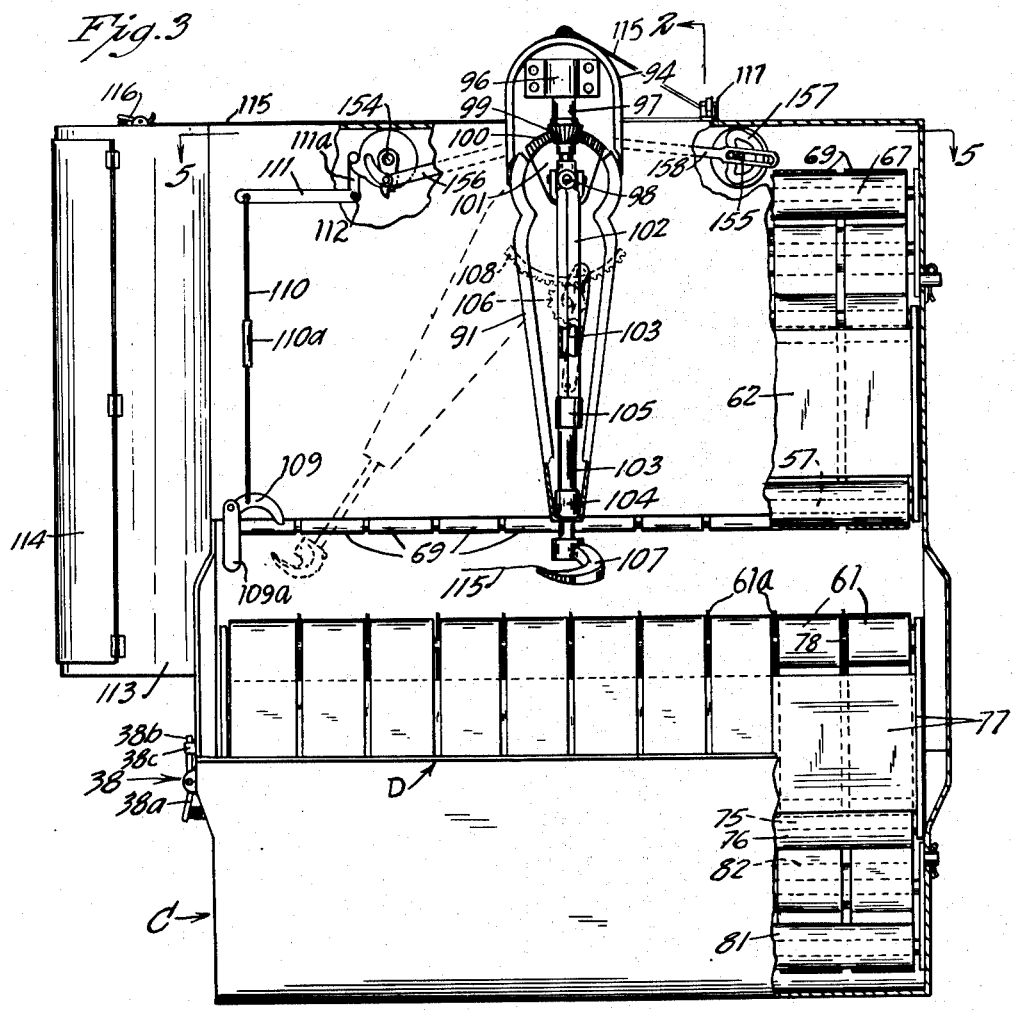
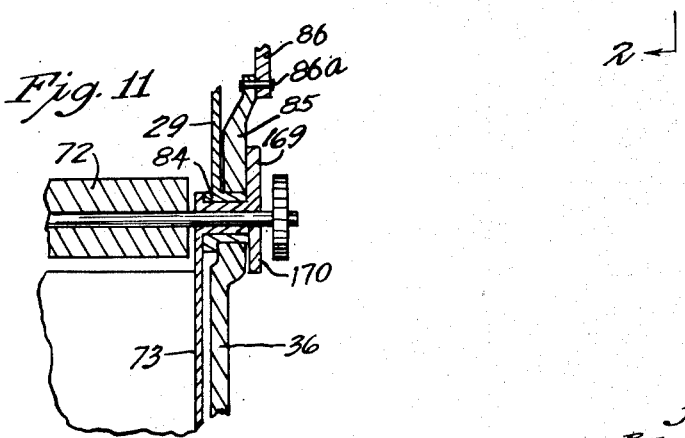
Inventor
Howard J. Berge
By Williamson & Williamson
Attorneys

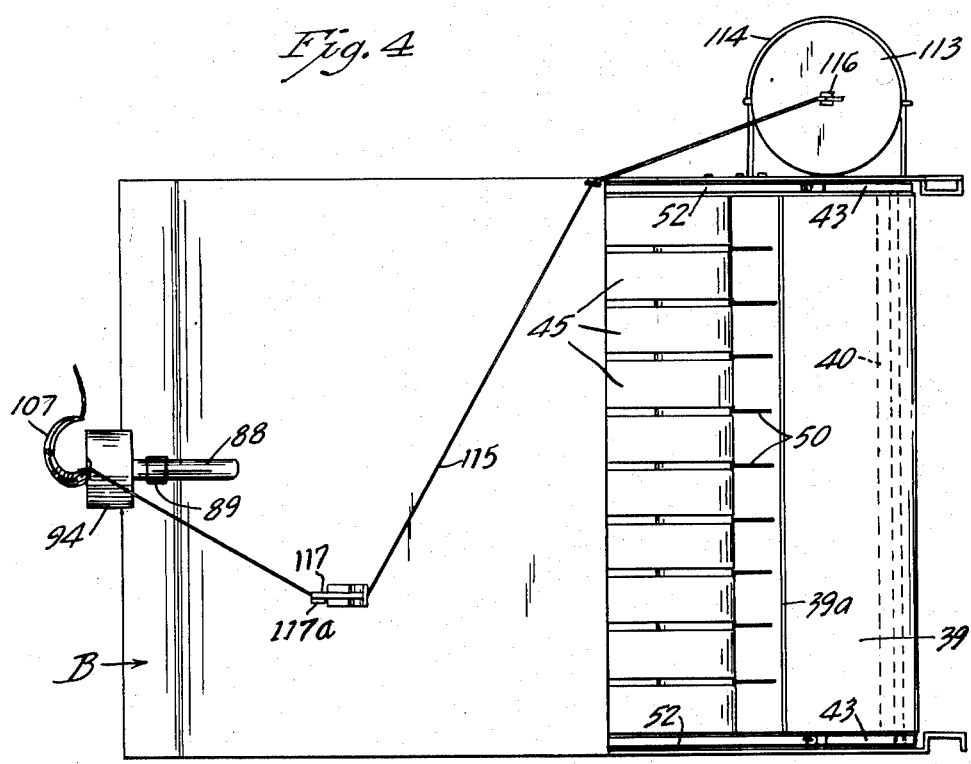
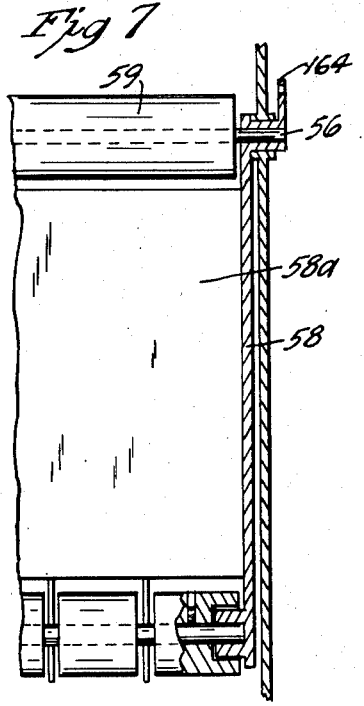
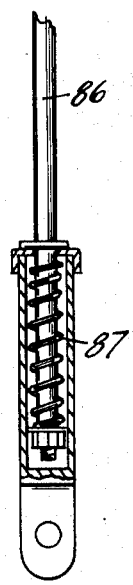
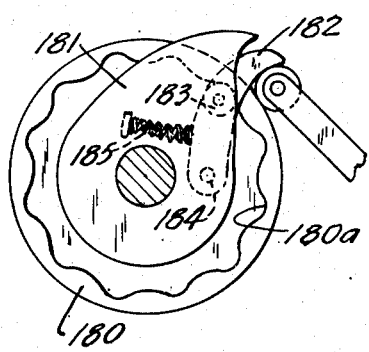

Patented Feb. 3, 1953

2,627,223

UNITED STATES PATENT OFFICE 2,627,223

BALING MACHINE FOR COMPACTING STRAW AND STALKS FROM HARVESTING MACHINES INTO CYLINDRICAL BALES

Howard J. Berge, Canby, Minn.

Application August 8, 1949, Serial No. 109,196

8 Claims. (Cl. 100—13)

My invention relates generally to machines for baling stalks and straw and particularly though not necessarily to a baling machine adapted to be cooperatively associated to a conventional crop-harvesting machine.

This application is a continuation for all subject matter in common with my co-pending application entitled Combine Bailing Attachment, Serial No. 748,920, filed May 19, 1947.

It is an object of my invention to provide a novel and highly efficient baling machine adapted to be cooperatively associated with a crop-harvesting machine such as a combine, or the like, to receive the discharge of straw or stalks and by a substantially continuous operation compact said material into bound bales as it is delivered from the harvesting machine.

It is another object to provide a plurality of cooperating jaw structures having a rolling and compacting mechanism mounted therein to receive stalk and straw discharge from a harvesting machine and to successively roll and compact said discharged material into substantially cylindrical bales and thereafter to successively bind said compacted bales and release the same for subseqeunt collection thereof.

It is a further object to provide a baler specifically adapted for attachment to a combine to work in close cooperation therewith and to receive the discharge of the residue from the straw racks, or straw walker, to feed said residue into the rolling and compacting mechanism thereof and when the compacted residue reaches a predetermined size to bind the same together and thereafter discharge said bound sales for subsequent collection.

It is a still further object to provide in a baling machine a binding mechanism adapted to be actuated when the bale reaches a predetermined size to feed a binding line into the rotating compacted bale and to secure both ends of the line to securely hold material in the bale together.

More specifically, it is an object to provide a baler adapted to successively compact a quantity of residue material from a crop harvester into substantially cylindrical bales by application of a high-speed rotary action to the material as it is received from a harvesting machine and to impart this rotary action by a series of rolling and compacting runs of a belt structure and constructed to permit said runs to swing outwardly in unison while maintaining constant rotary contact with the bale as said bale increases in size and, upon said bales reaching a predetermined size, to successively securely bind and discharge the same.

Still more specifically, it is an object to provide a rolling and compacting mechanism for a baler incorporating the use of a plurality of swingable arm structures to carry the respective rolling and compacting runs of a rolling and compacting belt structure and including resilient means for urging said arm structures into close association to maintain contact at all times with the material being compacted and to gradually expand against said resilient force as the volume of material being compacted increases.

It is still another object to provide a baler having a plurality of cooperating jaw structures adapted to initially compact a substantially predetermined volume of material into a bale and with mechanism for binding said material securely together, certain of said jaw structures being constructed to swing into open position to permit discharge of the compacted bale after completion of the binding operation.

These and other objects and advantages of the invention will more fully appear from the following description made in connection with the accompanying drawings wherein like reference characters refer to the same or similar parts throughout the different views, and in which Fig. 1 is a side elevation showing my baling machine attached to a conventional combine;

Fig. 2 is a vertical sectional view taken substantially along the line 2—2 of Fig. 3;

Fig. 3 is a rear end elevational view of my machine with a portion broken away and the side releasing doors and side exterior driving and actuating mechanism removed;

Fig. 4 is a top plan view of the structure shown in Fig. 3;

Fig. 7 is a fragmentary sectional view showing the detail of the construction and mounting of a typical roller carrying compacting arm structure;

Fig. 8 is a fragmentary view showing the detail of the lower end portion of one of the interconnection links for operating the side door bale-releasing mechanism;

Fig. 9 is a detail vertical sectional view showing a typical clutch mechanism;

Fig. 10 is a fragmentary perspective view of one of the discs for operating the bale dumping mechanism;

Fig. 11 is a substantially horizontal sectional view showing the construction of the lower jaw carrying arms and the relation therewith of the compacting arm structure and the drive shaft for the lower bale rolling and compacting mechanism;

Figure 5:
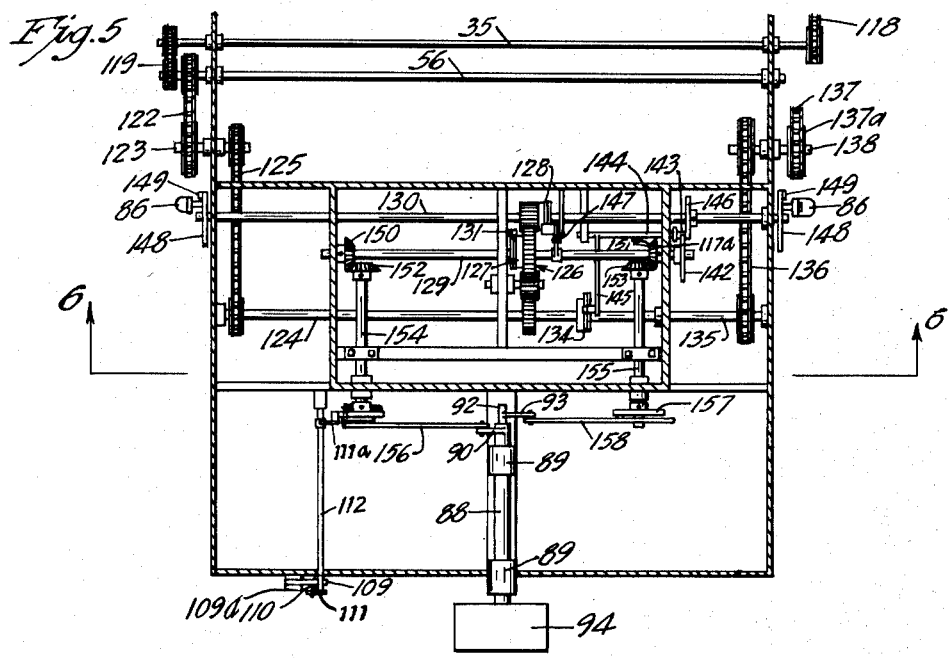
Fig. 5 is a horizontal sectional view showing the driving mechanisms contained in gear box J for timed operation of certain parts of my machine.

As best shown in Fig. 1, I provide a baling machine particularly adapted to be cooperatively associated with as by being attached to a conventional harvesting or threshing machine, such as the combine 25, having the discharge hood 26, and upright frame members 27. I provide a supporting structure having the outstanding upper and lower structural frame members 28 and 29, and upstanding attachment frame members 30. The attachment frame members 30 are rigidly interconnected at their respective ends to the forward ends of members 28 and 29. A pair of side plates 31 are rigidly fixed across the open side between the respective members 28 and 29 to form the sides of a straw-receiving hopper, designated as an entirety by the letter A. The top of the hopper A is, of course, open and disposed in close association to the discharge hood 26 of the combine 25. The upright attachment members 30 at the respective sides of the hopper A, in the form shown, are rigidly connected to the upright frame members 27 of the combine 25, as by the bolts 32. An upper jaw structure B, and a lower jaw structure C are mounted in outwardly extending relation to the outer portion of the hopper A. The upper jaw structure is suitably supported in fixed relation relative to hopper A as by the downwardly curved frame members 33. A sheet metal cover 34 is provided in the form shown for the upper jaw structure B. As best shown in Figs. 1, 2 and 11, the lower jaw structure is pivotally mounted at the lower rear portion of the hopper A on a shaft 35. This shaft 35 is journaled in suitable fixed bearings mounted in the outer portions of lower frame members 29. A pair of jaw carrying members 36 are provided to swingably carry the lower jaw structure B and a suitable cover plate 37 is provided in the form shown to underlie said lower jaw. The two jaw structures join when in closed position along the line designated by the letter D, and a suitable latch mechanism 38 is provided at each side of the joint D to lock said jaws together during the rolling and compacting operation.

As best shown in Fig. 2, I provide a feeder mechanism designated as an entirety by the letter E. The feeder mechanism E has a bed, or table, such as the apron 39 in the form of an endless belt, mounted in the bottom thereof. The endless belt is trained about a pair of spaced roller structures 40 respectively mounted on the shafts 41 and 42. The two shafts 41 and 42 are interconnected by the frame structure 43, and the shaft 41 provides an axis on which said frame structure may be adjustably swung, with suitable means for securely locking the apron 39 with the rear end thereof at the desired elevation. In the form shown, suitable cleats 39a are provided on the surface of the apron and a suitable belt tightener 44 is provided to maintain a substantially predetermined tension in the endless conveyor apron belt. An upper feeder belt 45 is mounted on a pair of spaced roller structures 46 and 47, which are respectively driven by the shafts 48 and 49. A beater 50 is mounted for rotation on a suitable shaft disposed substantially parallel to shaft 49 and in close association therewith, and a driving connection 51 is made between shaft 49 and beater 50 to rotate the beater at a relatively high speed. A swingable belt supporting frame, having the arms 52, interconnects shafts 48 and 49. A fulcrum 53 is provided at the rear portion of the arms 52 to produce a floating upper feeder mechanism, and a spring 54 is connected with each of the arms 52 to resiliently urge the forward end of the conveyor belt 45 downwardly toward the lower conveyor apron 39. A slot 48a is provided in at least one side plate 31 to permit swinging movement of the shaft 48. A belt tightener 55 is provided for the shaft 49 to maintain the tension in the belt 45. As best shown in Fig. 2, the hopper A has a guiding plate 31a rigidly interposed between the side plates 31 to guide the material rearwardly in the hopper.

The feeder E feeds the material into a rolling and compacting mechanism mounted on the two jaw structures B and C. A portion of the rolling and compacting mechanism is mounted in the upper fixed jaw structure B. A pair of pivot shafts 56 and 57 extend across the width of the machine and have their ends respectively journaled in suitable bearings, as best shown in Fig. 7. A swingable relatively short compacting arm structure 58 is journaled for oscillation on shaft 56 in suitable bearings, surrounding said shaft, as best shown in Fig. 7. A roller 59 is fixed to the shaft 56 for rotation therewith. A shaft 60 is journaled in the outer free ends of the arms 58 and has a plurality of roller sections 61 mounted thereon. A plurality of belt retaining discs 61a are respectively interposed between the roller sections 61 to prevent a plurality of belt sections from running off said roller sections. A curved plate 58a rigidly interconnects the two arms 58, as best shown in Figs. 2 and 7. A somewhat longer arm structure 62, but similar in construction to any structure 58, is journaled for oscillation on shaft 57, and a shaft 63 is journaled between the outer free ends of the arms 62. The rollers, in the form shown, which are mounted on shafts 57 and 63 are interchangeable with the roller 59 and roller sections 61, respectively mounted on shafts 56 and 60. Belt retaining discs are mounted on the shaft 63 between the respective roller sections and are interchangeable with the discs 61a, previously described.

A pair of plates 64 are journaled for swinging movement at the respective sides of the upper jaw B on a pair of stub shafts 65 and combine with the rollers 66 and 67 and the spring 68 to form a belt tightener for the upper rolling and compacting belt structure which is designated as an entirety by the numeral 69 and which in the form shown consists in a plurality of relatively narrow belt sections. A roller 70 mounted on a shaft 71 journaled in suitable fixed bearings at the respective ends thereof, is provided as an idler guiding roller, as best shown in Fig. 2.

The lower portion of the rolling and compacting mechanism is generally similar in operation and construction to the upper portion of the rolling and compacting mechanism described above. The shaft 35 has a roller 72 mounted thereon and a compacting arm structure 73 is journaled for oscillation thereon in a bearing, such as the bearing shown in Fig. 11, for the compacting arm structure 58. A shaft 74 is journaled in the outer portion of the arm structure 73 and a plurality of roller sections and belt guides 61 and 61a respectively are mounted thereon in a manner similar to that previously described. A fourth pivot shaft is journaled for rotation between the side frame members of the lower jaw C, as best shown in Fig. 2, and has a roller 76 mounted thereon. A compacting arm 77 is journaled on shaft 75 and a shaft 78 is journaled between the outer free ends of said compacting arm 77. The roller structure and belt retaining discs mounted on shaft 78 are similar to the roller 61 and discs 61a. A pair of belt tightener plates 79 are respectively journaled at the lower portions of the sides of the lower jaw C on suitable stub shafts 80. The pulleys 81 and 82 combine with the plates 79 and springs 83 to form a belt tightener similar to the belt tightener previously described for the upper portion of the rolling and compacting mechanism.

The lower jaw unit C is swingably mounted on a pair of double bearings 84 in which arm structure 73 is journaled are mounted in the fixed supporting frame members 29, as best shown in Fig. 11. The jaw carrying members, or arms, 36, are journaled for swinging movement on said bearings 84, and the compacting arm structure 73 is also journaled within said bearing for swinging movement independently of jaw carrying arms 36. As best shown in Figs. 1 and 11, a crank arm 85 is fixed in outstanding relation to each arm 36 and a jaw-dumping link 86 is pin-connected thereto, as by the pin 86a. As best shown in Fig. 8, a spring cushioning mechanism 87 is provided in each of the links 86 to prevent injury to the dumping mechanism during the dumping operation. The actuating mechanism for the links 86 will be described subsequently.

A bale binding mechanism, designated as an entirety by the letter F, is provided, as best shown in Figs. 1, 2, 3, and 4. The binding mechanism F is supported by a sleeve 88, which is journaled in suitable bearings 89 fixed to the supporting structure for the upper jaw structure B and is oscillated by a suitable crank arm 90 fixed thereto at the inner portion thereof. A depending arm structure 91 is fixed to the sleeve 88 for oscillation therewith. A shaft 92 is journaled for oscillation in sleeve 88 and is actuated by a crank arm 93. An upper casing element 94 is rigidly fixed to the supporting frame 33 as by the attachment bracket 95. A bearing 96 is provided in the casing 94 and a depending shaft 97 is journaled therein. The shaft 97 has a conventional universal joint 98 inserted therein and is oscillated by a pinion 99 fixed thereto and a rack in the form of an arcuate segment 100 which is fixed to an upstanding lever arm 101 which is secured at its lower portion to shaft 92. The portion of the shaft 97 disposed below the universal joint 98 is in the form of a hollow polygonal sleeve such as the square sleeve member 102, best shown in Fig. 3. A lower depending shaft 103 is journaled for rotation in a suitable bearing 104 fixed at the lower extremity of depending arm structure 91. A second bearing 105 is collared to an intermediate portion of the shaft 103 to reciprocate said shaft. A pinion 106 is journaled in a suitable bearing mounted in depending arm structure 91 and is disposed forwardly of said arm structure. A shaft is fixed to said pinion 106 and extends rearwardly through structure 91 and has a crank arm fixed at the inner end thereof. Said crank arm is connected to bearing 105 by a suitable connecting rod, or link, to reciprocate said shaft section 103. The upper portion of the shaft section 103 is square in cross-section and is slidably received in the hollow square sleeve 102, as best shown in Fig. 3.

A twine-guiding needle 107 is fixed to the bottom of shaft 103 and is oscillated thereby. A fixed rack 108 in the form of a curved segment is mounted at the rear of the supporting structure and is intermeshed with the pinion 106 to impart rotation to said pinion, shaft and crank arm fixed thereto to project shaft 103 downwardly as said depending arm structure is swung outwardly on its horizontal axis during the binding operation. This reciprocation of shaft 103 maintains a substantially straight line horizontal movement of the needle 107 during the binding operation. A twine cutting knife 109 is mounted at one side of the binding machine and is disposed directly over the position of the twine after it has been secured at the second end of the completed bale. As best shown in Fig. 3 the knife 109 is pivoted to a bracket 109a and a link 110 having the turnbuckle adjustment 110a interconnects said knife with a lever 111 fixed to crank shaft 112 and connected with an actuating mechanism which will be described subsequently. A twine box 113 is mounted in fixed relation at the side of the hopper A and has a hinged closure 114 to facilitate loading of the twine therein. The twine 115 is discharged through a suitable opening at the top provided with a frictional resistance 116 to prevent excessive unwinding of the twine as it is discharged from the box 113. The twine extends from the resistance 116 over through a positive brake 117 and from there it extends down and is threaded through the needle 107 to extend out from the free end thereof.

Figure 6:
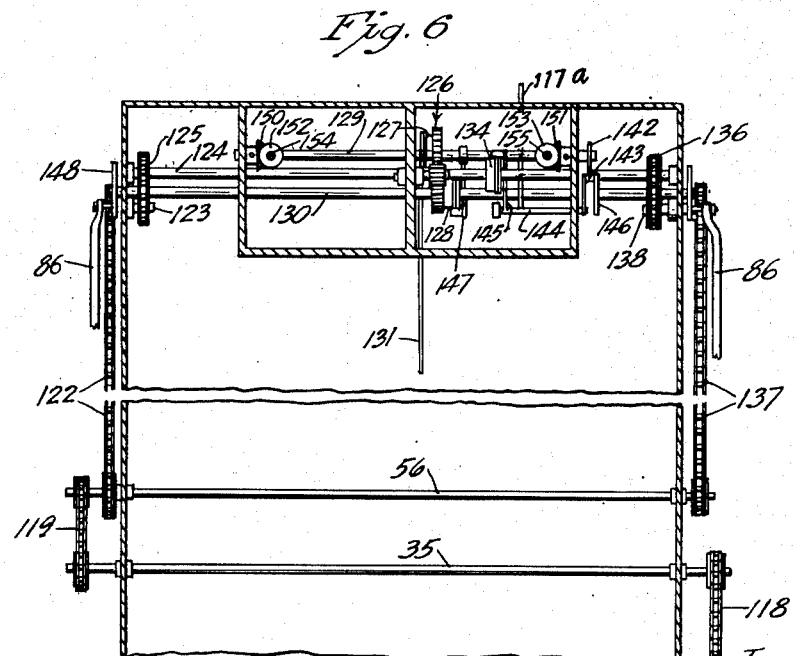
Fig. 6 is a vertical sectional view taken substantially along the line 6—6 of Fig. 5.

Referring now to Figs. 1, 2, 5, and 6, power is supplied from the combine 25 through a chain and sprocket drive 118 to the shaft 35 which drives the lower compacting and winding belt structure as best shown in Figs. 1 and 2. The other end of the shaft 35 is connected by a chain and sprocket drive 119 to the shaft 56 which drives the upper rolling and compacting belt structure. As best shown in Figs. 5 and 6, a chain and sprocket driving connection 122 on shaft 56 is provided to drive a stub shaft 123 which is connected to a power shaft 124 as by the chain and sprocket driving connection 125. A gear train 126 is constantly driven by shaft 124 and the clutch mechanisms 127 and 128, respectively, control the rotation of shafts 129 and 130. The clutch 127 is engaged by a control rod 131, as best shown in Fig. 2, which is actuated by a trip-lever 132 fulcrummed at 133 and responsive for actuation to contact by roller structure 61 when in expanded position as shown by the full lines in Fig. 1. A spring 132a maintains lever 132 in rest position against stop 132b and holds rod 131 in normal retracted position. A feeder control clutch 134 is connected to shaft 124 and is normally engaged to drive feeder drive shaft 135 to normally drive the entire feeder mechanism E through the chain and sprocket driving connections 136 and 137 and stub shaft 138. The chain 137 is trained about a sprocket 137a and a sprocket 139 to drive shaft 41 and the rear run is meshed with a sprocket 140 to drive shaft 48. A belt tightener 141 is provided to maintain driving tension in chain 137 when arms 52 and the sprocket 140 carried thereby shift during the feeding operation depending upon the load being carried by the feeder E.

As soon as the shaft 129 begins to rotate, a clutch disengaging mechanism disengages the normally engaged feeder control clutch 134. A notched disc 142 is fixed to the end portion of shaft 129 and normally receives a bell crank roller 143 therein. A crank shaft 144 is fixed to roller 143 and a clutch throw-out rod 145 is fixed to shaft 144 for oscillation therewith. As soon as roller 143 rides out of the notch in disc 142 due to the rotation of shaft 129, the roller 143 is shifted and the bell crank mechanism throws out clutch 134 and holds the same in disengaged position throughout one complete revolution of shaft 129. An internal cam 146 is fixed to shaft 130 and the roller 143 is of sufficient length to be engaged by the outstanding flange portion of said internal cam. This flange has an outwardly extending portion normally disposed in directly opposed relation to the notch in the camming disc 142. The clutch 128 is normally disengaged, but as soon as the shaft 129 completes a single revolution, a control lever 147 serves to engage the clutch 128 and begin the rotation of shaft 130. The flange of the internal cam 146 holds the roller 143 and bell crank mechanism in clutch disengaging position to hold the clutch 134 out of engagement during a complete revolution of shaft 130. The externally extending portions of shaft 130 are connected respectively to a pair of discs 148 to which the upper ends of the jaw dumping links 86 are respectively pivoted. These discs 148 have an outwardly extending camming surface 149 formed in the outer marginal portion of the periphery thereof. The purpose of these camming surfaces 149 is to normally hold a pair of side releasing doors in closed position as will be described hereafter.

The shaft 129 has a pair of spaced beveled gears 150 and 151 fixed thereto as best shown in Figs. 5 and 6. These bevel gears are respectively intermeshed with co-operating bevel gears 152 and 153, which are respectively fixed to shafts 154 and 155 for driving the same. A pitman mechanism 156 forms the connection between shaft 154 and the mechanism for swinging the depending binding arm structure 91 to which sleeve 88 is fixed. This pitman, of course, oscillates the arm 91 through a complete cycle to move the needle out to one end of a compacted bale and back the full length of the bale at which point the twine is secured around the bale and cut and thereafter the arm 91 is swung back into substantially vertical rest position. The pitman wheel of mechanism 156 which is fixed to shaft 154 has a cam fixed on the outer periphery thereof for engagement with the upstanding crank arm 111a of cutter actuating lever 111 which operates the cutter mechanism for cutting the twine after completion of the binding operation. The shaft 155 has a pitman wheel fixed thereto and a pitman arm 158 is co-operatively associated with an eccentrically mounted pin on wheel 157 to form a connection between said wheel 157 and the needle oscillating arm 93. An elongated slot is formed in the pitman arm 158 to receive the pin of disc 157 and provide a limited lost motion connection therewith to shift said arm 158 only in the extreme positions of the pin and providing only a limited shifting movement of arm 158 and oscillation of shaft 92.

A pair of side releasing and dumping doors 159 are respectively mounted at the sides of the rolling and compacting chamber H to normally close the same and provide abutment members for the ends of the compacted bale during the compacting operation. A pair of door supporting arms 160 are respectively fixed to said doors 159 as best shown in Fig. 1 and are intermediately pivoted to the rigid frame members 161, as by the pivot pins 162. The upper ends of the arms 160 are respectively equipped with a pair of cam-engaging rollers 163 to be normally engaged by the outwardly extending cams 149 on discs 148 as best shown in Figs. 1 and 10. As soon as the shaft 130 begins its revolution, each of the rollers 163 will ride off the raised cam 149 and permit the doors 159 to swing outwardly a slight distance to release the ends of the completed bale and permit the same to be dumped. The pin connections of the upper ends of the arms 86 to the discs 148 are disposed inwardly from cams 149 and provide sufficient clearances for the cams 149 to rotate under the overlying portions of said arms 86. As best shown in Fig. 1 a pair of springs 160a are respectively interposed between the arms 160 and the rigid side plates of the machine, to urge said doors into open position, the cam 149 securely holding said doors in closed position during the compacting operation.

The latch mechanism 38 for holding the two jaws together at D has a bent bar 38a fulcrumed at its bent portion on the lower jaw C. The upper portion of the bar 38a has an inwardly extending latch member 38b fixed thereto in overlying relation to a portion of the upper jaw B and also the peripheral portion of the door 159. A catch member 38c is fixed to the upper jaw B and is adapted to normally engage the outstanding latch member 38b to securely hold said jaws B and C together. One of these latch mechanisms is provided on each side of the machine and each has a resilient element for normally holding the same in locked position. As soon as the doors 159 are released and permitted to swing outwardly, the latch mechanisms 38 are released by engagement with said doors to permit the jaw C to be swung downwardly into dumping position by the links 86. The doors 159 do not need to swing more than a few inches and hence the latch elements 38b remain in contact with said doors even during the dumping operation.

An interconnection mechanism is provided to coordinate the inward and outward swinging movement of the elements of the rolling and compacting mechanism and is best shown in Figs. 1 and 7. Fig. 7 illustrates a typical arrangement of the compacting arm structure and the bell crank arms 164 and 165, which are fixed to arm structure 58. Bell crank arms 166 and 167 are journaled on shaft 71 and a bell crank arm 168 is fixed to compacting arm structure 62 for swinging movement about shaft 57 as an axis. A pair of bell cranks 169 and 170 are fixed to compacting arm structure 73 for swinging movement about shaft 75 as an axis, and a bell crank 171 is fixed to compacting arm structure 77 for oscillation on shaft 75. The bell cranks 164 and 167 are interconnected by a link 172. Bell cranks 165 and 169 are interconnected by a link 173, and bell cranks 170 and 171 are interconnected by a link 174. A suitable resilient element such as the spring 175 is connected to the bell crank arm 171 to urge the compacting arm structures 77 and 73 into retracted position as shown by the dotted lines in Fig. 2. A pivoted lever 176 is interconnected at one end to bell crank 166 by a link 177 and at the other end to bell crank 168 by a link 178. A resilient element such as the spring 179 resiliently urges compacting arm structures 58 and 62 into normal retracted position as shown by the dotted lines in Fig. 2. Similar bell crank and link mechanisms are mounted on both sides of the machine.

A typical clutch mechanism such as that used in clutches 127, 128 and 134 is illustrated in Fig. 9 in which the disc member 180 is connected to a rotary member and is constantly rotated. A stop member 181 is entirely free from disc 180, but is fixed to a shaft to be driven through the clutch. A clutch engaging arm 182 having a roller 183 journaled thereon is pivoted on pin 184, and a compression spring 185 normally urges said roller 183 into the rounded toothed portion 180a formed on a flange fixed to rotary disc 180. This clutch structure is of conventional design and any other suitable clutch mechanism could be used. The clutch, of course, is disengaged and the driven shaft immediately stopped by engagement of the arms 181 and 182 by an actuating rod, such as shown in Fig. 9.

Operation

The hopper A is positioned under the discharge hood 26 of the combine 25 to receive the stalks and straw from the straw rack or straw walker (not shown). The straw is discharged with some force and travels downwardly into the hopper A where it is engaged by the lower apron 39, which carries it toward the mouth G of the compacting chamber H. The apron 39, of course, combines with the floating beater 50 and upper conveyor 45 to carry the straw toward the mouth G and discharge said straw through said mouth into the compacting chamber H. The apron 39 can be lowered to receive the stalks and straw from the sieves at the lower portion of the combine discharge, or may be elevated to exclude this finer material. A clamping element 43a is shown in Fig. 1 for setting said apron in any desired position.

The compacting arm structures 58, 62, 77 and 73, are all shown by dotted lines in inwardly retracted position in Fig. 2 and are urged into said position by the springs 175 and 179 and the crank and link mechanisms connected therewith. The belts of the upper jaw B and the lower jaw C are moving in the direction shown by the arrows in Fig. 2 and the straw mass is rolled and compacted at the center of chamber H, being rolled in a direction illustrated by the curved arrow in said chamber. The run of the rolling and compacting belt mounted on arm structure 73 adjacent mouth G carries the straw into the center portion of the chamber H as it is fed by feeder E and combines with the run supported by arm structure 58 to impart rotary motion thereto as it passes between said opposed runs. As the material is collected in the chamber H, it is rolled and compacted into a substantially cylindrical bale by the action of the belts resiliently pressed thereagainst by the springs 175 and 179 and mechanisms connected therewith. As the size of this cylindrical compacted mass increases, the arm structures 58, 62, 77 and 73 swing outwardly toward the full line position of Fig. 2.

When the diameter of the compacted bale is such that the arm structures reach the position shown by full lines in Fig. 2, the trip-lever 132 is engaged by the roller structure 61 and actuates clutch engaging rod 131. The rod 131 engages clutch 127 which permits the rotation of shaft 129 through a single revolution. Rotation of shaft 129 immediately disengages feeder driving clutch 134 through the bell crank mechanism 143, 144 and 145. Rotation of the shaft 129 operates the binding mechanism and swings arm 91 over to the end of the bale farthest from the twine cutter 109. The arm 158 is actuated by wheen 157 to impart rotary movement to shaft 92 through crank arm 93 to swing rack 100 through a predetermined arc and thereby rotate the pinion 99 and shaft 97 and swing the needle 107 inwardly to feed the free end of twine 115 into the rotating bale. The beginning of this binding operation is timed to take place when the arm 91 is still a substantial distance from the end of the bale farthest away from the knife 109. After beginning the discharge of the twine 115, the arm 91 swings outwardly to within a slight distance of the said end of the bale to secure the end of the twine under several convolutions thereof. As soon as the arm 91 begins its swinging movement the twine break 117 is immediately released by a mechanism 117a as best shown in Figs. 2, 3, 5 and 6. This is accomplished by a crank arm mechanism 117a on shaft 144 as best shown by Figs. 2, 5 and 6. As the arm 91 swings outwardly to the side, the pinion 106 is rotated by the fixed arcuate rack 108 to project shaft 103 downwardly and swing the needle 107 through a substantially horizontal straight line path. The arm 91 swings back to the dotted position shown in Fig. 3 and during this swinging movement continuously discharges twine to form a series of substantially spiral convolutions around the constantly rotating compacted bale to securely bind the same together. Shortly before reaching the second end of the bale, the needle 107 is again swung inwardly by the cam actuation of pitman arm 158. By swinging said needle into the bale at this point, the twine is discharged under at least one convolution thereof and, in most cases, under several convolutions which serves to secure the second end of the binding twine around the bale. This interjection of the twine between the convolutions and the bale material is facilitated by the fact that the rolling and compacting structures of the two jaws B and C are slightly spaced apart at the point of interjection as best shown in Fig. 2 to produce a slightly slack portion in each convolution as it passes through this open space between the compacting mechanism of the two jaws. The pitman mechanism 157 is constructed with a lost motion connection to permit the arm 91 to be retained in its upwardly swung position as shown by dotted lines in Fig. 3 and the pitman wheel 157 and arm 158 retract the needle from its inserted position at least a distance of several inches while the arm 91 is held in its upwardly swung position. With the arm 91 in this position and the needle partially retracted, the knife 109 is actuated by bell cranks 111a and 111 to cut the twine and provide a free end portion thereof to extend outwardly from the free end of the needle 107 and facilitate feeding of the twine into the next bale.

When the shaft 129 has completed one revolution, the lever 147 will actuate clutch 128 and permit one revolution of shaft 130, which actuates the dumping mechanism for jaw C. The flange of cam 146 holds the clutch 134 in disengaged position during one complete revolution of shaft 130 and the discs 148 are rotated through one complete revolution by said shaft 130. Rotation of the discs 148 actuates the links 86 and shifts cam 149 to release the doors 159 which, in turn, release the latch mechanisms 38 to permit the upper jaw B and lower jaw C to be separated at D when the links 86 are shifted upwardly to swing the crank arm 85 upwardly on its bearing 84. With the ends of the bale released and the lower jaw C in extreme dumping position as shown by the dotted lines in Fig. 2, the bale is free to drop down onto the ground and is thus discharged from the rolling and compacting chamber H. The discs 148 through the links 86 positively return the jaw C into closed position and the latch mechanisms 38 securely lock the same in said position. The cams 149 positively close the doors 159 just prior to the final closing of the jaw C to permit locking operation of the latch mechanisms 38. As soon as the shaft 130 reaches its rest position, the feeder control clutch 134 is again returned to normal engaged position to drive the feeder mechanism E.

In the baling of straw and other stalk material, there are two closely interrelated problems which have to be successfully solved to produce an efficient baling machine. These two problems consist in initially compacting the stalk material and, secondly, binding the compacted bales together to prevent separation of the compacted material. It will be seen that I have provided a highly efficient baling machine adapted to work in close association with a harvesting machine, such as a combine, to initially roll and compact the straw or stalks discharged from said harvesting machine into bales and to thereafter provide a highly efficient automatically actuated binding mechanism to securely bind the compacted material together and to thereafter automatically discharge the completed bales.

All of the mechanisms of my baling machine are synchronized and timed to work in close co-operation one with the other and to closely co-operate with the harvesting machine to receive the discharge therefrom. The elements of the rolling and compacting mechanism are all interconnected so that upon expansion thereof, as the bale increases in size, all of said elements will expand in unison and maintain rolling and compacting contact with the material on all sides thereof during the compacting operation.

The binding mechanism travels in a substantially horizontal straight line across the rear end of the machine and successfully secures both ends of the binding twine to prevent subsequent unwinding of the convolutions of said twine from around the bales, and securely holds said convolutions in binding position.

It will, of course, be understood that various changes may be made in the form, details, arrangement and proportions of the parts without departing from the scope of my invention.

The embodiment of the invention disclosed is particularly adapted as an attachment, or for manufacture as standard equipment in conventional combines and other harvesting machines. It will, of course, be understood that my baling machine, including the closely cooperating rolling and compacting mechanism, and bale binding mechanism, is well adapted for manufacture as a separate portable, or stationary, baling machine, all within the scope of my invention.

What I claim is:

1. In a baling machine, mechanism for rolling and compacting a mass of material such as stalks or straw, said mechanism comprising a plurality of jaw structures arranged in pivotal relation one to the other, said jaws being closed during the compacting operation and being adapted to be opened for discharge of a completed bale, a plurality of compacting arm structures swingably mounted on said jaw structures, a plurality of rolling and compacting elements respectively mounted on said swingable arm structures, tensioning mechanism connected to said arm structures for urging said rolling and compacting elements into retracted position and permitting expansion thereof as the mass of material being compacted increases, and means for driving said rolling and compacting elements.

2. In a baling machine, mechanism for rolling and compacting a mass of material such as stalks or straw, said mechanism comprising a plurality of jaw structures arranged in pivotal relation one to the other, jaw operating mechanism for holding said jaws in closed relation during the rolling and compacting operation and for swinging said jaws into open position for discharge of a completed bale, a plurality of compacting arm structures swingably mounted on said jaw structures, a plurality of rolling and compacting elements respectively mounted on said swingable arm structures, tensioning mechanism interconnecting said arm structures for simultaneously urging all of said rolling and compacting elements into retracted position at the beginning of the compacting operation and permitting simultaneous and equal expansion of all of said elements as the mass of material being compacted increases, means for driving said rolling and compacting elements, and mechanism for actuating said jaw operating mechanism.

3. In a baling machine, mechanism for rolling and compacting a mass of material such as stalks or straw, said mechanism comprising a plurality of jaw structures arranged in pivotal relation one to the other, a plurality of compacting arm structures swingably mounted on said jaw structures, a plurality of rolling and compacting elements respectively mounted on said swingable arm structures and forming a rolling and compacting chamber between said jaw structures, a pair of closure doors mounted at the sides of said chamber to normally close the same, dumping mechanism connected with at least one of said jaws and with said doors to simultaneously release said doors and swing said connected jaw into open position to discharge a completed bale, means for driving said rolling and compacting elements, and mechanism for actuating said dumping mechanism.

4. In a baling machine, mechanism for rolling and compacting a mass of material such as stalks or straw, said mechanism comprising a plurality of jaw structures arranged in pivotal relation one to the other, said jaws being closed during the compacting operation and being adapted to be opened for discharge of a completed bale, a plurality of compacting arm structures swingably mounted on said jaw structures, a plurality of rolling and compacting elements respectively mounted on said swingable arm structures, tensioning mechanism connected to said arm structures for urging said rolling and compacting elements into retracted position and permitting expansion thereof as the mass of material being compacted increases, means for driving said rolling and compacting elements, and a feeder mechanism for positively delivering the stalks and straw to the rolling and compacting elements.

5. In a baling machine, mechanism for rolling and compacting a mass of material, such as stalks or straw, said mechanism comprising a plurality of jaw structures arranged in pivotal relation one to the other, said jaws being closed during the compacting operation and being adapted to be opened for discharge of a completed bale, a plurality of compacting arm structures swingably mounted on said jaw structures, a plurality of rolling and compacting elements respectively mounted on said swingable arm structures, tensioning mechanism connected to said arm structures for urging said rolling and compacting elements into retracted position and permitting expansion thereof as the mass of material being compacted increases, means for driving said rolling and compacting elements, and a binding mechanism adapted to interpose an elongated flexible binding element between the rolling and compacting elements and the compacted bale while said bale is being rolled at a high velocity, mechanism for shifting said binding element along the length of said rotating bale to form a series of binding convolutions therearound and mechanism for anchoring the binding element around the bale at the end of the binding operation.

6. In a baling machine, mechanism for rolling and compacting a mass of material such as stalks or straw, said mechanism comprising a plurality of jaw structures arranged in pivotal relation one to the other, said jaws being closed during the compacting operation and being adapted to be opened for discharge of a completed bale, a plurality of compacting arm structures swingably mounted on said jaw structures, a plurality of rolling and compacting elements respectively mounted on said swingable arm structures, tensioning mechanism connected to said arm structures for urging said rolling and compacting elements into retracted position and permitting expansion thereof as the mass of material being compacted increases, means for driving said rolling and compacting elements; and a binding mechanism comprising a horizontally shiftable needle adapted to carry a flexible binding element therein, mechanism for shifting said needle to one end of said rotating bale, means for interposing the end of said binding element between said rolling and compacting elements and the rotating compacted material, mechanism for carrying said needle to one end of said bale and return the same to the other end of said bale while said bale is continuously rotated to form a series of binding convolutions around said compacting material, means for shifting said needle to interpose a portion of said flexible binding element between certain of said convolutions and the compacted material to anchor said binding element, means for holding said needle against horizontal shifting movement while said binding element is being severed.

7. The structure set forth in claim 6, and means for severing said binding element while said needle is being held against horizontal shifting movement.

8. The structure set forth in claim 6, and driving connections adapted to be attached to a source of rotary power, a plurality of inter-related actuating mechanisms synchronized for periodic actuation of the respective elements to successively roll and compact, bind and finally discharge a completed bale.

HOWARD J. BERGE.

REFERENCES CITED

The following references are of record in the file of this patent:

UNITED STATES PATENTS

| Number | Name | Date |
|---|---|---|
| 331,932 | Workman | Dec. 8, 1885 |
| 366,943 | Evans | July 19, 1887 |
| 496,260 | Haugen | Apr. 25, 1893 |
| 798,969 | Luebben | Sept. 5, 1905 |
| 2,180,852 | Russell | Nov. 21, 1939 |
| 2,248,519 | Thompson | July 8, 1941 |
| 2,294,440 | Barker | Sept. 1, 1942 |